(12) United States Patent
Osawa et al.

(10) Patent No.: US 11,924,831 B2
(45) Date of Patent: Mar. 5, 2024

(54) USER EQUIPMENT (UE) FOR PERFORMING FLEXIBLE SCHEDULING FOR INTER-TERMINAL DIRECT COMMUNICATION

(71) Applicant: NTT DOCOMO, INC., Tokyo (JP)

(72) Inventors: Ryosuke Osawa, Tokyo (JP); Huan Wang, Haidian District (CN); Xiaolin Hou, Haidian District (CN)

(73) Assignee: NTT DOCOMO, INC., Tokyo (JP)

( * ) Notice: Subject to any disclaimer, the term of this patent is extended or adjusted under 35 U.S.C. 154(b) by 530 days.

(21) Appl. No.: 17/264,128

(22) PCT Filed: Aug. 10, 2018

(86) PCT No.: PCT/JP2018/030146
§ 371 (c)(1),
(2) Date: Jan. 28, 2021

(87) PCT Pub. No.: WO2020/031384
PCT Pub. Date: Feb. 13, 2020

(65) Prior Publication Data
US 2021/0321384 A1    Oct. 14, 2021

(51) Int. Cl.
*H04W 72/04* (2023.01)
*H04L 5/00* (2006.01)
*H04W 72/20* (2023.01)

(52) U.S. Cl.
CPC .......... *H04W 72/20* (2023.01); *H04L 5/0048* (2013.01)

(58) Field of Classification Search
CPC ......... H04W 72/20; H04W 8/20; H04W 4/00; H04W 36/0072; H04W 72/04; H04W 92/18; H04L 5/0048; H04L 5/00
See application file for complete search history.

(56) References Cited

U.S. PATENT DOCUMENTS

| 2013/0170406 A1* | 7/2013 | Kishiyama | H04W 72/0453 370/280 |
| 2017/0094657 A1* | 3/2017 | Yoon | H04L 5/0012 |

(Continued)

FOREIGN PATENT DOCUMENTS

| WO | 2018/012614 A1 | 1/2018 |
| WO | 2020009553 A1 | 1/2020 |

(Continued)

OTHER PUBLICATIONS

International Search Report issued in PCT/JP2018/030146 dated Oct. 9, 2018 (4 pages).

(Continued)

*Primary Examiner* — Mewale A Ambaye
(74) *Attorney, Agent, or Firm* — Osha Bergman Watanabe & Burton LLP

(57) ABSTRACT

A user equipment includes a control unit that controls transmission or reception of a sidelink signal in which a first resource and a second resource are multiplexed in a same slot, wherein at least one of SLSS (Sidelink synchronization signal) or PSBCH (Physical Sidelink Broadcast Channel) is allocated in the first resource, and at least one of PSCCH (Physical Sidelink Control Channel), PSSCH (Physical Sidelink Shared Channel), and PSDCH (Physical Sidelink Discovery Channel) is allocated in the second resource; a reception unit that monitors the first resource, the second resource, or the first resource and the second resource; and a transmission unit that performs transmission using any one of the first resource, the second resource, and the first resource and the second resource.

4 Claims, 14 Drawing Sheets

(56) References Cited

U.S. PATENT DOCUMENTS

| | | | |
|---|---|---|---|
| 2017/0290020 A1* | 10/2017 | Aiba | H04B 1/3816 |
| 2019/0313271 A1* | 10/2019 | Yiu | H04W 72/04 |
| 2019/0357248 A1* | 11/2019 | Takeda | H04L 5/0051 |
| 2020/0044796 A1* | 2/2020 | Yang | H04W 56/00 |
| 2020/0059873 A1* | 2/2020 | Takeda | H04J 11/0069 |
| 2020/0187165 A1* | 6/2020 | Park | H04L 1/1858 |

FOREIGN PATENT DOCUMENTS

| | | | |
|---|---|---|---|
| WO | 2020/033086 A1 | 2/2020 | |
| WO | WO-2020033086 A1 * | 2/2020 | G08G 1/22 |

OTHER PUBLICATIONS

Written Opinion of the International Searching Authority issued in PCT/JP2018/030146 dated Oct. 9, 2018 (4 pages).

3GPP TS 36.211 V15.2.0; "3rd Generation Partnership Project; Technical Specification Group Radio Access Network; Evolved Universal Terrestrial Radio Access (E-UTRA); Physical channels and modulation (Release 15)"; Jun. 2018 (236 pages).

3GPP TR 22.886 V15.1.0; "3rd Generation Partnership Project; Technical Specification Group Services and System Aspects; Study on enhancement of 3GPP Support for 5G V2X Services (Release 15)"; Mar. 2017 (58 pages).

Office Action in counterpart Japanese Patent Application No. 2020-535474 dated May 17, 2020 (6 pages).

H. Huawei; "Design considerations for D2DSS"; 3GPP TSG RAN WG1 Meeting #76bis, R1-141595; Shenzhen, China; Mar. 31-Apr. 4, 2014 (8 pages).

LG Electronics; "Discussion on D2D transmission power"; 3GPP TSG RAN WG1 Meeting #80, R1-150492; Athens, Greece; Feb. 9-13, 2015 (5 pages).

Intel Corporation; "UE Capabilities for LTE Rel. 15 V2X Communication"; 3GPP TSG RAN WG1 Meeting #93, R1-1806486; Busan, Korea; May 21-25, 2018 (5 pages).

Nokia et al.; "Final details of V2V synchronization procedure"; 3GPP TSG-RAN WG1 Meeting #86, R1-167804; Gothenburg, Sweden; Aug. 22-26, 2016 (5 pages).

H. Huawei.; "Short TTI solutions for R15 sidelink"; 3GPP TSG RAN WG1 Meeting #89, R1-1707006; Hangzhou, China; May 15-19, 2017 (5 pages).

LG Electronics; "Discussion on sidelink synchronization enhancement for PC5 based V2V"; 3GPP TSG RAN WG1 Meeting #84bis, R1-162486; Busan, Korea; Apr. 11-15, 2016 (5 pages).

H. Huawei; "SLSS and PSBCH consideration for V2V PC5"; 3GPP TSG RAN WG1 Meeting #84bis, R1-162640; Busan, Korea; Apr. 11-15, 2016 (7 pages).

Extended European Search Report issued in counterpart European Patent Application No. 18929613.0, dated Feb. 18, 2022 (7 pages).

Office Action issued in the corresponding European Application No. 18929613.0, dated Sep. 26, 2023 (5 pages).

* cited by examiner

USER EQUIPMENT (UE) FOR PERFORMING FLEXIBLE SCHEDULING FOR INTER-TERMINAL DIRECT COMMUNICATION

TECHNICAL FIELD

The present invention relates to user equipment in a radio communication system.

BACKGROUND ART

For LTE (Long Term Evolution) and LTE successor systems (e.g., LTE-A (LTE Advanced), NR (New Radio) (which is also referred to as 5G), D2D (Device to Device) technology has been studied in which units of user equipment directly communicate without going through a base station apparatus (e.g., Non-Patent Document 1).

D2D reduces traffic between user equipment and a base station apparatus, and D2D allows communication between units of user equipment, even if a base station apparatus is unable to communicate during a disaster or the like. In 3GPP (3rd Generation Partnership Project), D2D is referred to as "sidelink." However, in this specification, a more generic term, D2D, is used. Note that, in the embodiments described below, "sidelink" is also used, if necessary.

D2D communication is broadly classified into D2D discovery (which may also be referred to as D2D discovery or D2D detection) for detecting another unit of user equipment that is capable of communicating; and D2D communication (which may also be referred to as D2D direct communication, D2D communication, inter-terminal direct communication, or the like) for direct communication between units of user equipment. In the following, if D2D communication, D2D discovery, and the like are not particularly distinguished, they are simply referred to as D2D. Furthermore, signals transmitted and received in D2D are referred to as D2D signals. Various use cases of services related to NR V2X (Vehicle to Everything) have been studied (e.g., Non-Patent Document 2).

RELATED ART DOCUMENT

Non-Patent Document

Non-Patent Document 1: 3GPP TS 36.211 V15.2.0(2018-06)
Non-Patent Document 2: 3GPP TR 22.886 V15.1.0(2017-03)

SUMMARY OF THE INVENTION

Problem to be Solved by the Invention

In LTE sidelink, a subframe in which SLSS (Sidelink Synchronization Signal) and PSBCH (Physical Sidelink Broadcast Channel) are allocated is removed from a resource in which PSCCH (Physical Sidelink Control Channel), PSSCH (Physical Sidelink Shared Channel), and PSDCH (Physical Sidelink Discovery Channel) are allocated. Accordingly, it has been difficult to perform scheduling, for example, if communication occurs in which low latency is required.

The present invention has been accomplished in view of the above-described point, and an object is to perform flexible scheduling during inter-terminal direct communication.

Means for Solving the Problem

According to the disclosed technology, there is provided a user equipment including a control unit that controls transmission or reception of a sidelink signal in which a first resource and a second resource are multiplexed in a same slot, wherein at least one of SLSS (Sidelink synchronization signal) or PSBCH (Physical Sidelink Broadcast Channel) is allocated in the first resource, and at least one of PSCCH (Physical Sidelink Control Channel), PSSCH (Physical Sidelink Shared Channel), and PSDCH (Physical Sidelink Discovery Channel) is allocated in the second resource; a reception unit that monitors the first resource, the second resource, or the first resource and the second resource; and a transmission unit that performs transmission using any one of the first resource, the second resource, and the first resource and the second resource.

Advantage of the Invention

According to the disclosed technology, flexible scheduling can be performed for inter-terminal direct communication.

EMBODIMENTS OF THE INVENTION

Figure 1:
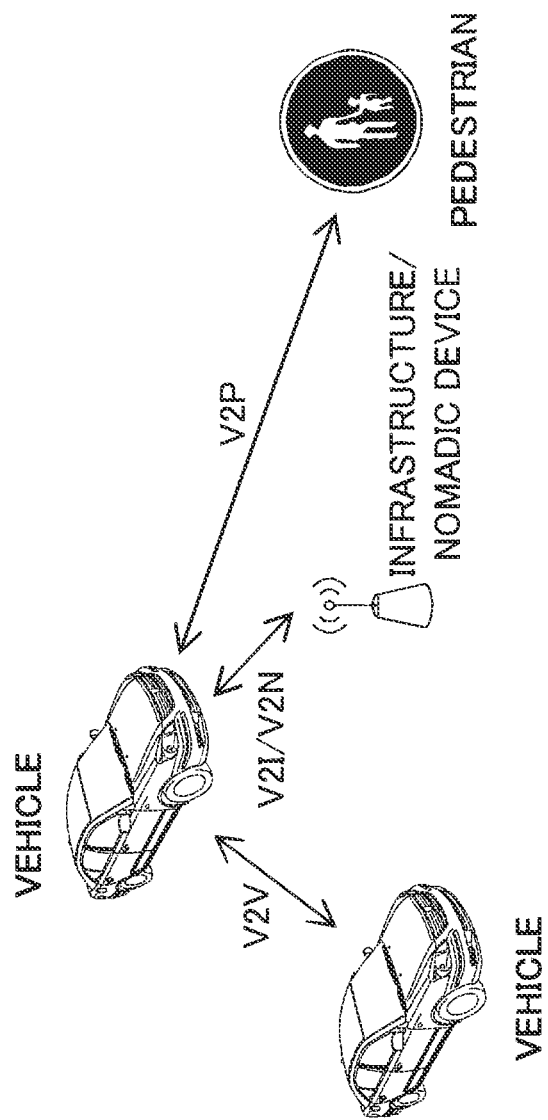
FIG. 1 is a diagram for illustrating V2X.

In the following, embodiments of the present invention are described by referring to the drawings. The embodiments described below are an example, and embodiments to which the present invention is applied are not limited to the following embodiments.

In an operation of a radio communication system of the embodiments of the present invention, existing technology is appropriately used. Here, the existing technology is, for example, existing LTE but not limited to existing LTE. Further, the term "LTE" used in this specification has a broad meaning including LTE-Advanced and a scheme subsequent to LTE-Advanced (for example, NR), unless as otherwise specified.

In the embodiments of the present invention, a duplex method may be a TDD (Time Division Duplex) method, an FDD (Frequency Division Duplex) method, or any other method (e.g., Flexible Duplex, etc.).

In the following description, a method of transmitting a signal using a transmission beam may be digital beam forming of transmitting a signal (pre-coded with a pre-coding vector) multiplied by a pre-coding vector or may be analog beam forming for implementing beam forming using a variable phase shifter in a radio frequency (RF) circuit. Similarly, a method of receiving a signal using a reception beam may be digital beam forming of multiplying a received signal by a predetermined weight vector or may be analog beam forming of implementing beam forming using a variable phase shifter in a RF circuit. Hybrid beam forming in which digital beam forming and analog beam forming are combined may be applied. Furthermore, transmitting a signal using a transmission beam may be transmitting a signal through a specific antenna port. Similarly, receiving a signal using a reception beam may be receiving a signal through a particular antenna port. An "antenna port" refers to a logical antenna port or a physical antenna port defined in the 3GPP standard. In addition, a precoding or the beam forming is also referred to as a "pre-coder" or a "spatial domain filter."

A method of forming the transmission beam and the reception beam is not limited to the above-described methods. For example, in a base station apparatus 10 or a user equipment 20 provided with a plurality of antennas, a method of changing an angle of each antenna may be used, a method in which a method using a precoding vector and a method of changing an angle of an antenna are combined may be used, a method of switching and using different antenna panels may be used, a method of using a combination of a plurality of antenna panels may be used, or any other method may be used. Furthermore, for example, a plurality of different transmission beams may be used in a high frequency band. Using a plurality of transmission beams is referred to as a multi-beam operation, and using a single transmission beam is referred to as a single beam operation.

Furthermore, in an embodiment of the present invention, when a radio parameter or the like is "configured", it may mean that a predetermined value is "pre-configured" or it may mean that a radio parameter provided by notification from the base station apparatus 10 or the user equipment 20 is configured.

FIG. 1 is a diagram for illustrating V2X. In 3GPP, implementing vehicle to everything (V2X) or enhanced V2X (eV2X) by extending a D2D function is under review, and technical specification documentation development thereof is in progress. As illustrated in FIG. 1, V2X is a part of intelligent transport systems (ITS) and is a generic term of vehicle to vehicle (V2V) meaning a communication form performed between vehicles, vehicle to infrastructure (V2I) meaning a communication form performed between a vehicle and a road-side unit (RSU) installed on a road side, vehicle to Nomadic device (V2N) meaning a communication mode performed between a vehicle and an ITS server, and vehicle to pedestrian (V2P) meaning a communication mode performed between a vehicle and a mobile terminal carried by a pedestrian.

In 3GPP, V2X using cellular communication and inter-terminal communication of LTE or NR has been studied. For V2X of LTE or NR, review not limited to 3GPP specification is expected to be conducted from now. For example, cost reduction by securing of interoperability and implementing of an upper layer, a combining or switching method of a plurality of radio access technologies (RATs), support of regulation in each country, and data acquisition, delivery, database management, and use method of V2X platform of LTE or NR are expected to be under review.

In the embodiments of the present invention, a form in which the communication device is installed on a vehicle is mainly assumed, but embodiments of the present invention are not limited to this form. For example, the communication device may be a terminal carried by a person, the communication device may be a device installed in a drone or an aircraft, and the communication device may be a base station, an RSU, a relay station (relay node), or the like.

Note that sidelink (SL) may be distinguished from uplink (UL) or downlink (DL) based on one of the following 1) to 4) or a combination thereof. Furthermore, SL may have any other name.

1) A resource arrangement in a time domain
2) A resource arrangement in a frequency domain
3) A synchronization signal to be referred to (including a sidelink synchronization signal (SLSS))
4) A reference signal used for path loss measurement for transmission power control Furthermore, for orthogonal frequency division multi-plexing (OFDM) of SL or UL, any one of cyclic-prefix OFDM (CP-OFDM), discrete Fourier transform-spread-OFDM (DFT-S-OFDM), OFDM without transform precoding, and OFDM with transform precoding may be applied.

In SL of LTE, Mode 3 and Mode 4 are specified for SL resource allocation to the user equipment 20. In Mode 3, transmission resources are dynamically allocated in accordance with downlink control information (DCI) transmitted from the base station apparatus 10 to the user equipment 20. In Mode 3, semi persistent scheduling (SPS) can be performed as well. In Mode 4, the user equipment 20 autonomously selects transmission resources from a resource pool.

Figure 2:
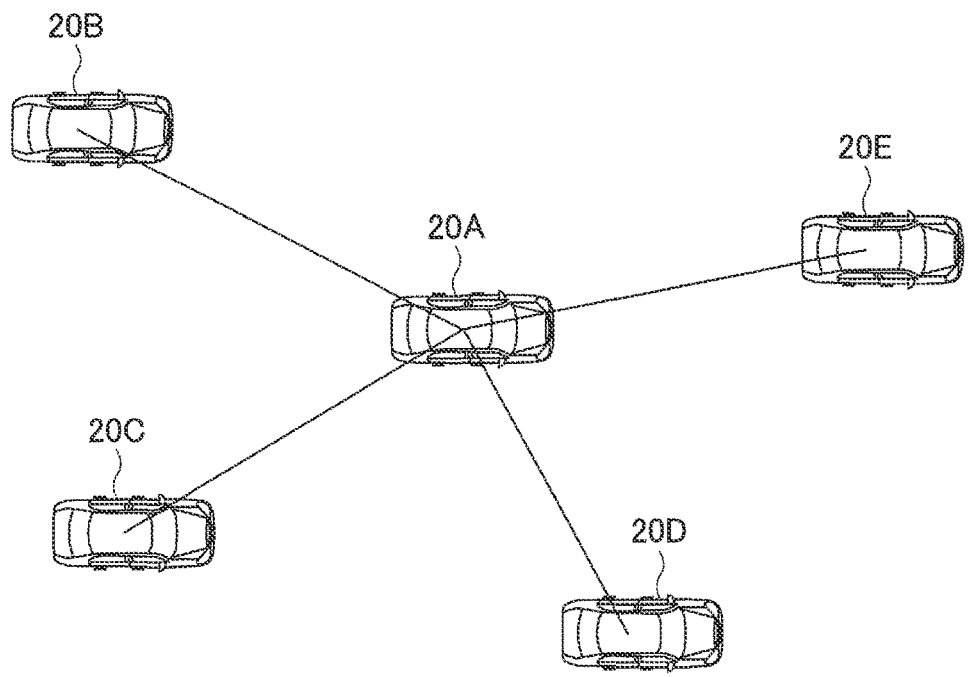
FIG. 2 is a diagram illustrating an example of a radio communication system in an embodiment of the present invention.

FIG. 2 is a diagram illustrating an example of a radio communication system according to an embodiment of the present invention. Using FIG. 2, an example is illustrated in which five units of user equipment 20A, 20B, 20C, 20D, and 20E are included in the radio communication system and perform SL communication with each other. The user equipment 20A can perform SL communication by unicast with any unit of the user equipment 20B, 20C, 20D, or 20E. For example, when the units of user equipment 20B and 20C form a group, the user equipment 20A may perform SL communication with the units of user equipment 20B and 20C by group casting. The user equipment 20A may perform SL communication with all of the units of user equipment 20B, 20C, 20D, and 20E by broadcast.

Figure 3:
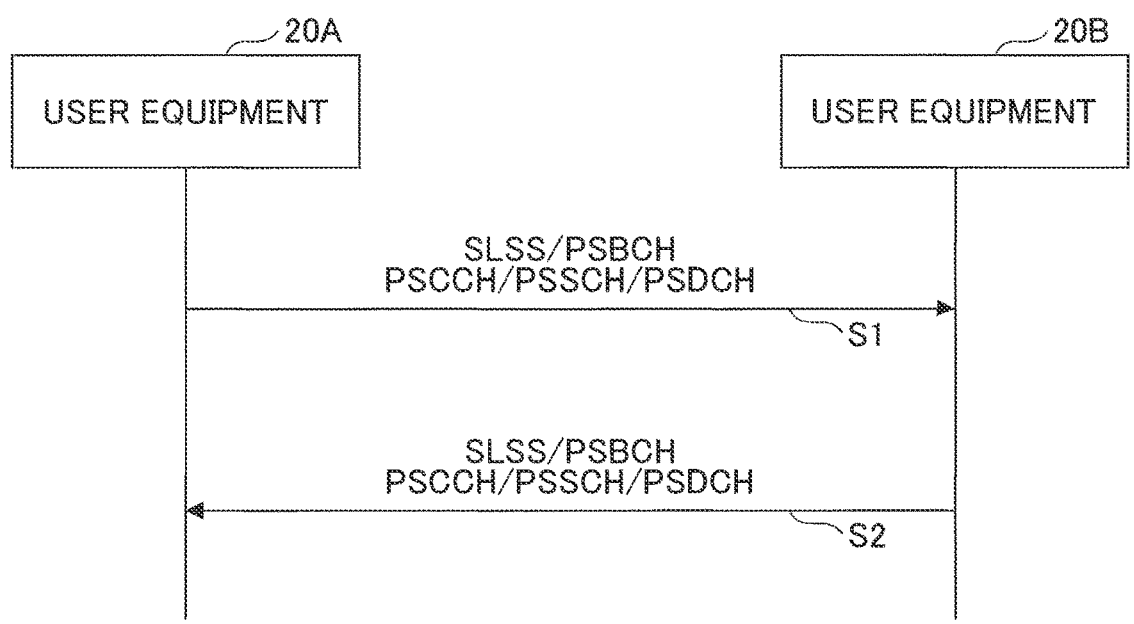
FIG. 3 is a sequence diagram for illustrating an example of sidelink communication in an embodiment of the present invention.

FIG. 3 is a sequence diagram illustrating an example of side-link communication according to an embodiment of the present invention. In step S1, user equipment 20A transmits a radio signal to user equipment 20B in which SLSS (Sidelink Synchronization Signal), PSBCH (Physical Sidelink Broadcast Channel), PSCCH (Physical Sidelink Control Channel), PSSCH (Physical Sidelink Shared Channel), and/or PSDCH (Physical Sidelink Discovery Channel) are allocated. The user equipment 20B receives SLSS and PSBCH, acquires control information required for synchronization and transmission, and receives data via PSSCH scheduled by PSCCH. SLSS and/or PSBCH may be omitted if they can be otherwise synchronized and/or if necessary control information can be obtained (e.g., synchronization using signals transmitted from base station apparatus 10 or GNSS (Global Navigation Satellite System), acquisition of broadcast information, or the like).

Similarly, in step S2, the user equipment 20B transmits a radio signal to the user equipment 20A in which SLSS, PSBCH, PSCCH, PSSCH, and/or PSDCH are allocated. The user equipment 20A receives the SLSS and PSBCH, performs synchronization, and receives data via the PSSCH scheduled by the PSCCH. The SLSS and/or PSBCH may be omitted if synchronization can be achieved in other ways and/or if necessary control information can be obtained (e.g., synchronization using signals transmitted from base station apparatus 10 or GNSS, acquisition of informational information, etc.).

Figure 4:
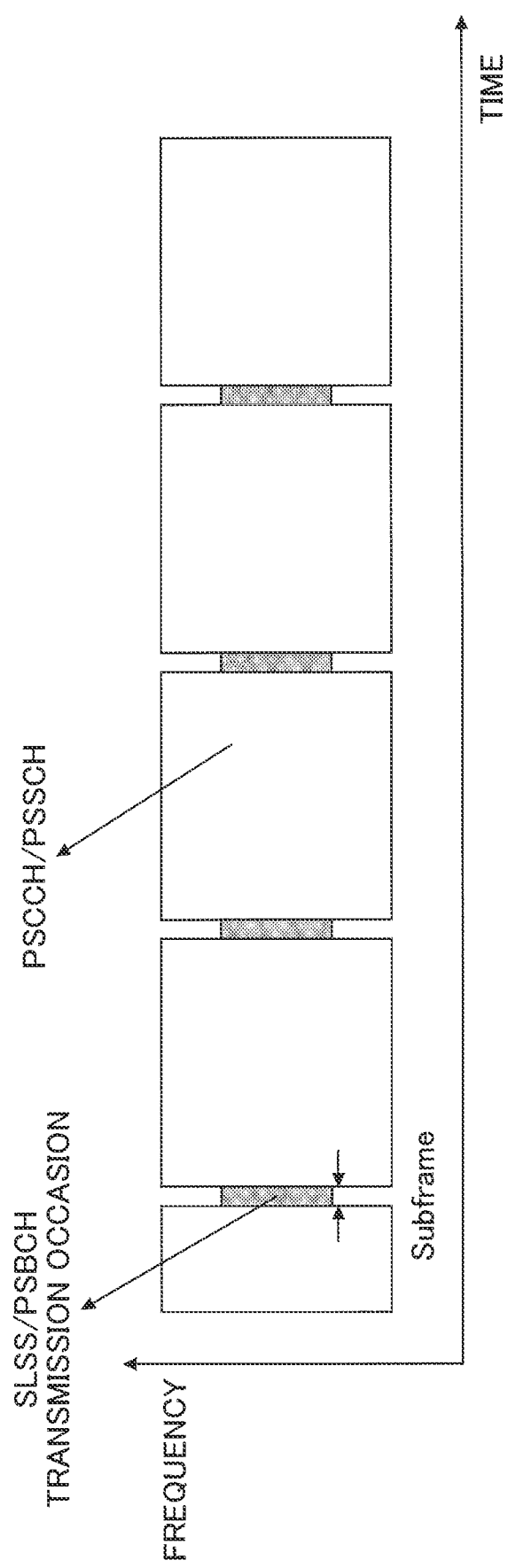
FIG. 4 is a diagram illustrating an example (1) of a sidelink channel allocation.

FIG. 4 is a diagram illustrating an example (1) of a sidelink channel allocation. Hereinafter, in a diagram illustrating a channel allocation, the vertical axis corresponds to the frequency domain, and the horizontal axis corresponds to the time domain. The user equipment 20 can transmit SLSS and PSBCH to operate as a synchronization source. As illustrated in FIG. 4, SLSS and PSBCH are multiplexed to occupy the entire subframe. Also, as illustrated in FIG. 4, the subframes in which the SLSS and PSBCH are allocated are excluded from the sidelink resources in which the PSCCH or PSSCH is allocated.

Figure 5:
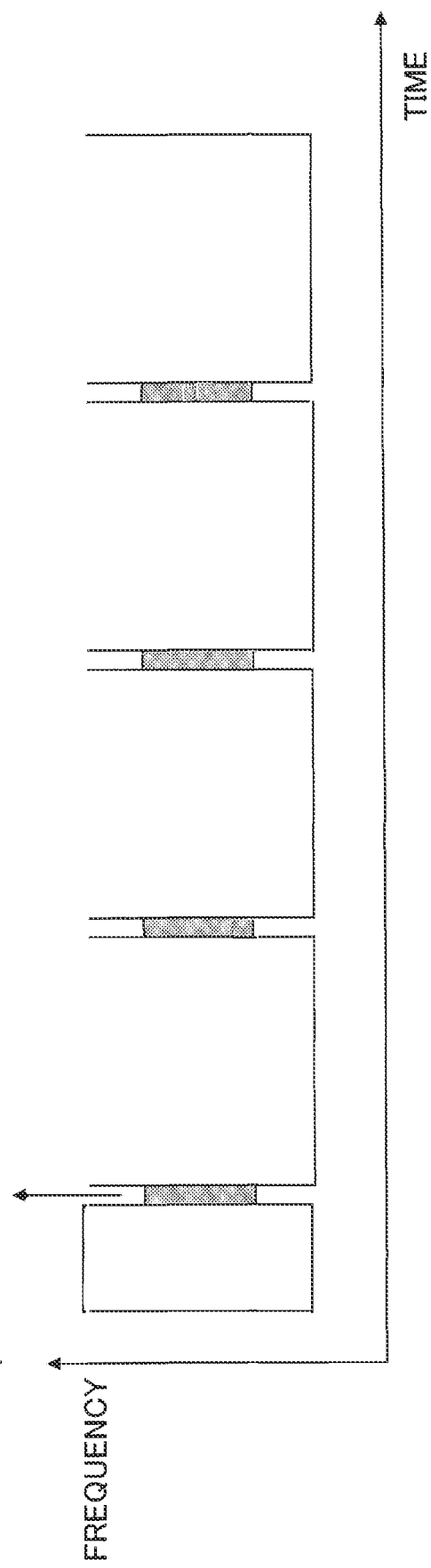
FIG. 5 is a diagram illustrating an example (2) of a sidelink channel allocation.

FIG. 5 is a diagram illustrating an example (2) of a sidelink channel allocation. As illustrated in FIG. 5, the user equipment 20 is unable to transmit and receive data during a period of SLSS and PSBCH transmission occasions. Accordingly, scheduling may be a limiting factor for achieving URLLC (Ultra-Reliable and Low Latency Communications) in sidelink communication, for example.

Figure 6:
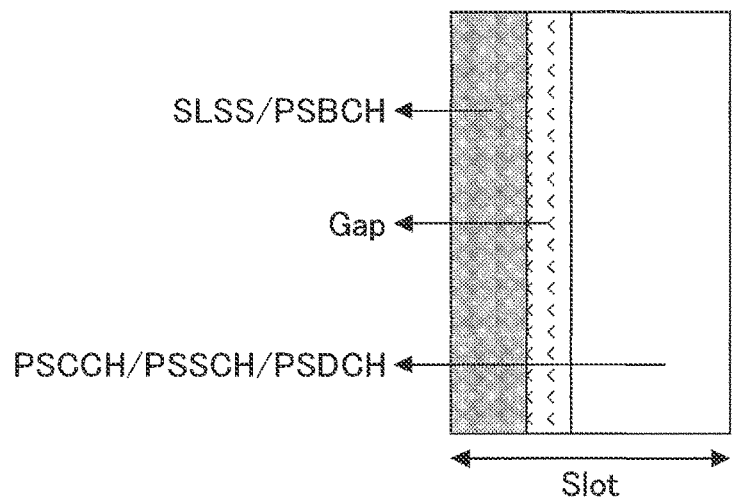
FIG. 6 is a diagram illustrating an example (1) of a channel allocation in an embodiment of the present invention.

FIG. 6 is a diagram illustrating an example (1) of a channel allocation according to an embodiment of the present invention. As illustrated in FIG. 6, SLSS and/or PSBCH and PSCCH, PSSCH, and/or PSDCH may be configured or predefined to be multiplexed in one slot. Furthermore, as illustrated in FIG. 6, a gap (which may be referred to as a Guard Period) may be provided between the resources where the SLSS and/or PSBCH are allocated and the resources where the PSCCH, PSSCH and/or PSDCH are allocated. The order of allocation of SLSS and/or PSBCH and PSCCH, PSSCH, and/or PSDCH may be any order.

A technical specification may specify that a resource in which SLSS and/or PSBCH are allocated is excluded from a resource in which PSCCH, PSSCH and/or PSDCH are allocated. All of the symbols in which the SLSS and/or PSBCH are allocated may be excluded from a resource in which the PSCCH, PSSCH and/or PSDCH are allocated. Alternatively, only a RE (Resource element), REG (Resource element group), PRB (Physical Resource block) or subchannel where the SLSS and/or PSBCH are allocated may be excluded from a resource in which the PSCCH, PSSCH and/or PSDCH are allocated. PSCCH, PSSCH and/or PSDCH may be frequency division multiplexed and/or time division multiplexed with SLSS and/or PSBCH.

If SLSS and/or PSBCH are placed preferentially in a resource where PSCCH, PSSCH and/or PSDCH are originally allocated, execution of rate matching or punching may be configured or predefined.

A gap between a resource where the SLSS and/or PSBCH are allocated and a resource where the PSCCH, PSSCH and/or PSDCH are allocated can ensure a time for switching an RF circuit or the like, when the user equipment 20 receives multiplexed PSCCH, PSSCH and/or PSDCH in the same slot after transmitting the SLSS and/or PSBCH. Similarly, a time for switching an RF circuit or the like can be secured when the user equipment 20 transmits multiplexed PSCCH, PSSCH, and/or PSDCH in the same slot after receiving the SLSS and/or PSBCH.

Transmission of SLSS and/or PSBCH need not be performed if there is a sidelink resource in which other SLSS and/or PSBCH transmitted from a common source is allocated.

A waveform (e.g., whether Transform precoding is applied), numerology, or BWP (Bandwidth part) applied to SLSS and/or PSBCH, PSCCH, PSSCH and/or PSDCH may be configured or predefined, or a waveform, numerology, or BWP of UL or DL may be reused.

In the embodiments of the present invention, the "slot" may be replaced by any unit of resources corresponding to the time domain. For example, multiple slots, one or more slots, one or more subframes, one or more TTIs (Transmission Time Interval), one or more short TTIs (sTTIs), one or more symbols may be units of resources corresponding to the time domain.

The user equipment 20 may perform operations illustrated in 1)-6) below depending on the UE capability, a definition according to a technical specification, or a configuration.

1) User equipment 20 monitors both SLSS and/or PSBCH and PSSCH, and/or PSDCH in a slot where SLSS and/or PSBCH are multiplexed with PSCCH, PSSCH and/or PSDCH.
2) User equipment 20 transmits both SLSS and/or PSBCH and PSSCH, and/or PSDCH in slots where SLSS and/or PSBCH are multiplexed with PSCCH, PSSCH and/or PSDCH.
3) User equipment 20 monitors SLSS and/or PSBCH and transmits PSCCH, PSSCH and/or PSDCH in a slot where SLSS and/or PSBCH are multiplexed with PSCCH, PSSCH and/or PSDCH.
4) User equipment 20 transmits SLSS and/or PSBCH in a slot where SLSS and/or PSBCH are multiplexed with PSCCH, PSSCH and/or PSDCH to monitor PSCCH, PSSCH and/or PSDCH.
5) User equipment 20 may skip monitoring of SLSS and/or PSBCH when a sidelink resource in which other SLSS and/or PSBCH transmitted from a common source is allocated is available.

6) The user equipment 20 may skip monitoring of the SLSS when another synchronization signal transmitted from the base station apparatus 10, GNSS, or the like is available.

Figure 7:
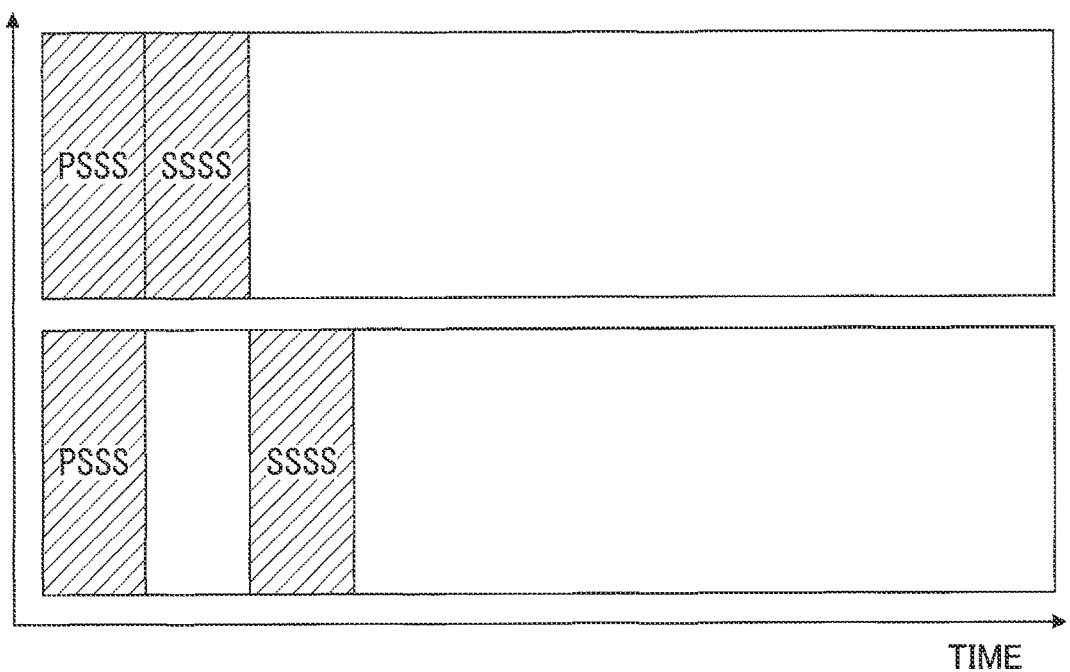
FIG. 7 is a diagram illustrating an example (2) of a channel allocation in an embodiment of the present invention.

FIG. 7 is a diagram illustrating an example (2) of a channel allocation according to an embodiment of the present invention. For each transmission of an SLSS or PSBCH, it may be configured or predetermined as to whether a resource of SLSS and a resource of PSBCH are multiplexed in a time domain, in a frequency domain, or in a time and frequency domain. Here, SLSS is assumed to include PSSS (Primary Sidelink Synchronization Signal) and SSSS (Secondary Sidelink Synchronization Signal) and PSBCH is assumed to include DMRS (Demodulation reference signal) and content of PSBCH. Furthermore, order of signals to be multiplexed using time division multiplexing and/or frequency division multiplexing in the examples illustrated below in FIGS. 7-13 may be any order. For example, in FIG. 7, an order is exemplified as PSSS and SSSS. However, the order may be SSSS and PSSS.

The PSSS and SSSS may be time division multiplexed. As illustrated in FIG. 7, the PSSS and SSSS may be allocated in adjacent slots or symbols, or in separated slots or symbols.

Figure 8:
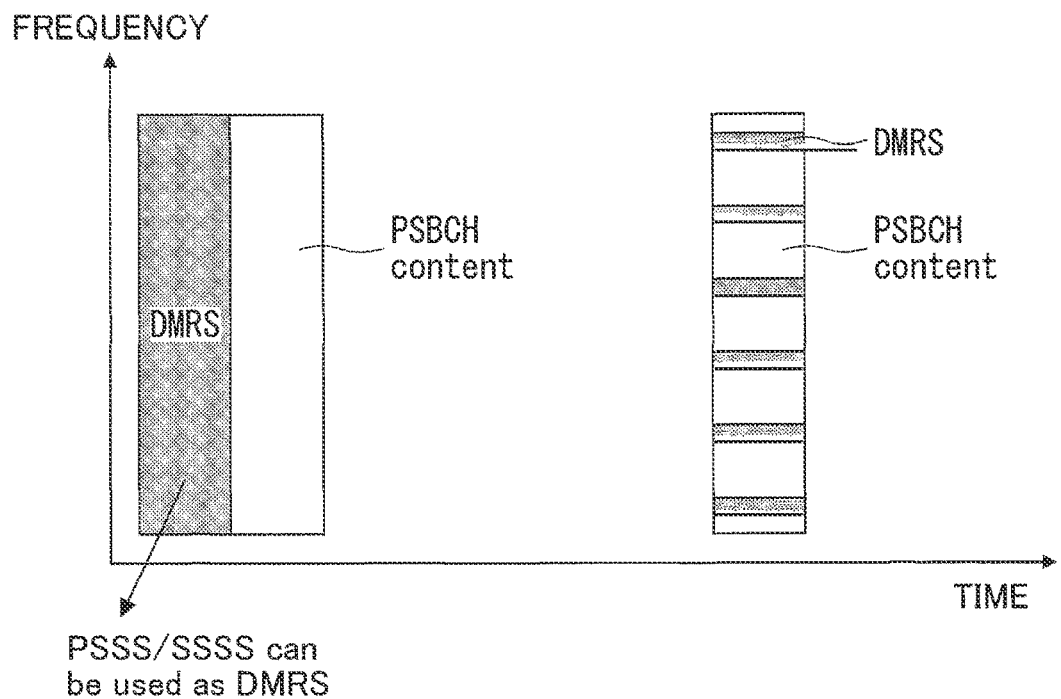
FIG. 8 is a diagram illustrating an example (3) of a channel allocation in an embodiment of the present invention.

FIG. 8 is a diagram illustrating an example (3) of a channel allocation according to an embodiment of the present invention. As illustrated in FIG. 8, the DMRS and the content of PSBCH may be frequency division multiplexed within a single symbol, or time division multiplexed with different symbols. If the content of DMRS and the content of PSBCH are allocated in different symbols, a specification may define that PSSS or SSSS is used as DMRS and that a normal DMRS is not allocated.

Figure 9:
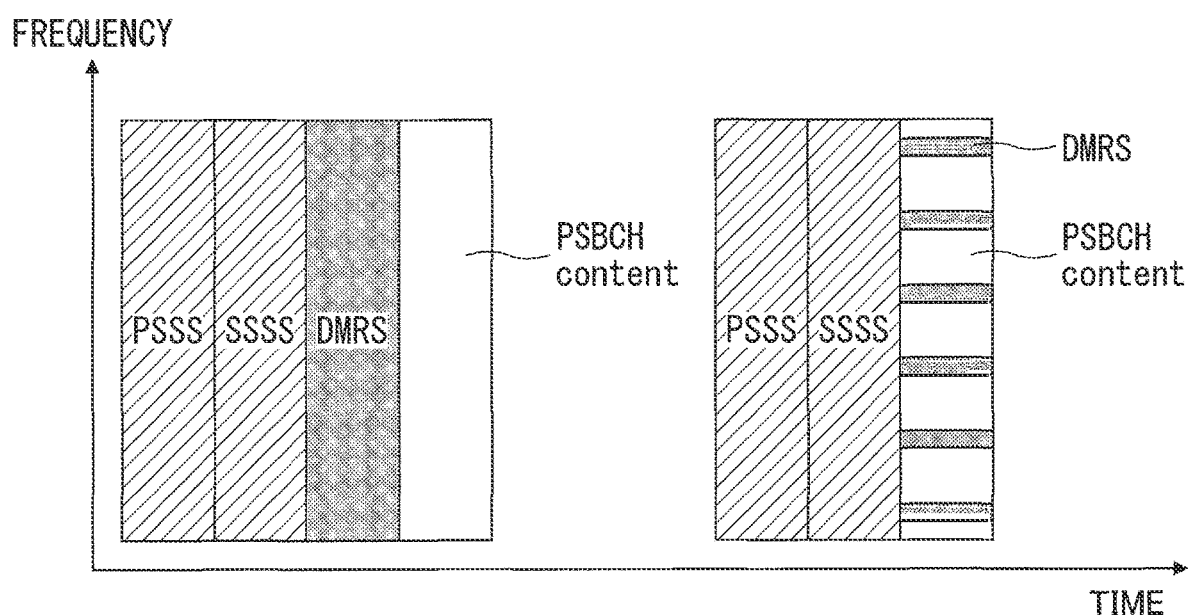
FIG. 9 is a diagram illustrating an example (1) of a channel allocation based on time division multiplexing in an embodiment of the present invention.

FIG. 9 is a diagram illustrating an example (1) of a channel allocation by time division multiplexing according to an embodiment of the present invention. FIG. 9 illustrates an example where the PSSS and SSSS are allocated in adjacent symbols and the SLSS and PSBCH are time division multiplexed. Hereinafter, symbol #n represents the nth symbol. As illustrated in FIG. 9, in a resource of four symbols, a PSSS may be allocated in symbol #1, a SSSS may be allocated in symbol #2, a DMRS may be allocated in symbol #3, and content of PSBCH may be allocated in symbol #4. Furthermore, as illustrated in FIG. 9, in a resource of three symbols, a PSSS may be allocated in symbol #1, a SSSS may be allocated in symbol #2, and a DMRS and content of a PSBCH that are frequency division multiplexed may be allocated in symbol #3.

Figure 10:
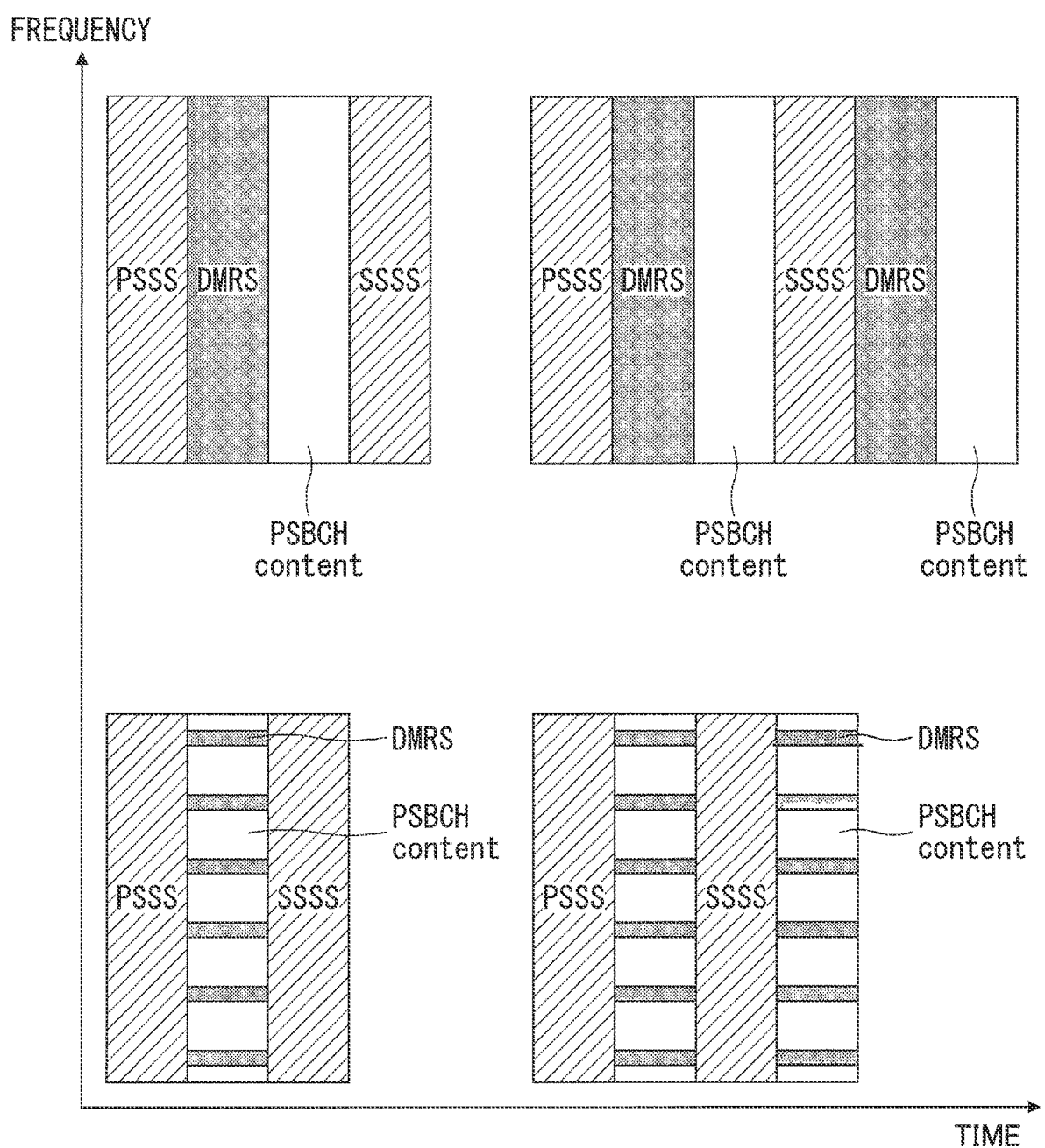
FIG. 10 is a diagram illustrating an example (2) of a channel allocation based on time division multiplexing in an embodiment of the present invention.

FIG. 10 is a diagram illustrating an example (2) of a channel allocation by time division multiplexing according to an embodiment of the present invention. FIG. 10 illustrates an example where the PSSS and SSSS are arranged in non-contiguous symbols and the SLSS and PSBCH are time division multiplexed. As illustrated in FIG. 10, in a resource of four symbols, a PSSS may be allocated in symbol #1, a DMRS may be allocated in symbol #2, content of a PSBCH may be allocated in symbol #3, and a SSSS may be allocated in symbol #4. Furthermore, as illustrated in FIG. 10, in a resource of six symbols, a PSSS may be allocated in symbol #1, the DMRS may be allocated in symbol #2, the content of the PSBCH may be allocated in symbol #3, the SSSS may be allocated in symbol #4, a DMRS may be allocated in symbol #5, and content of the PSBCH may be allocated in symbol #6.

As illustrated in FIG. 10, in a resource of three symbols, a PSSS may be allocated in symbol #1, a DMRS and content of a PSBCH that are frequency division multiplexed may be allocated in symbol #2, and a SSSSS may be allocated in symbol #3. Furthermore, as illustrated in FIG. 10, in a resource of four symbols, a PSSS may be allocated in symbol #1, a DMRS and content of a PSBCH that are frequency division multiplexed may be allocated in symbol #2, a SSSS may be allocated in symbol #3, and a DMRS and content of a PSBCH that are frequency division multiplexed may be allocated in symbol #4.

Figure 11:
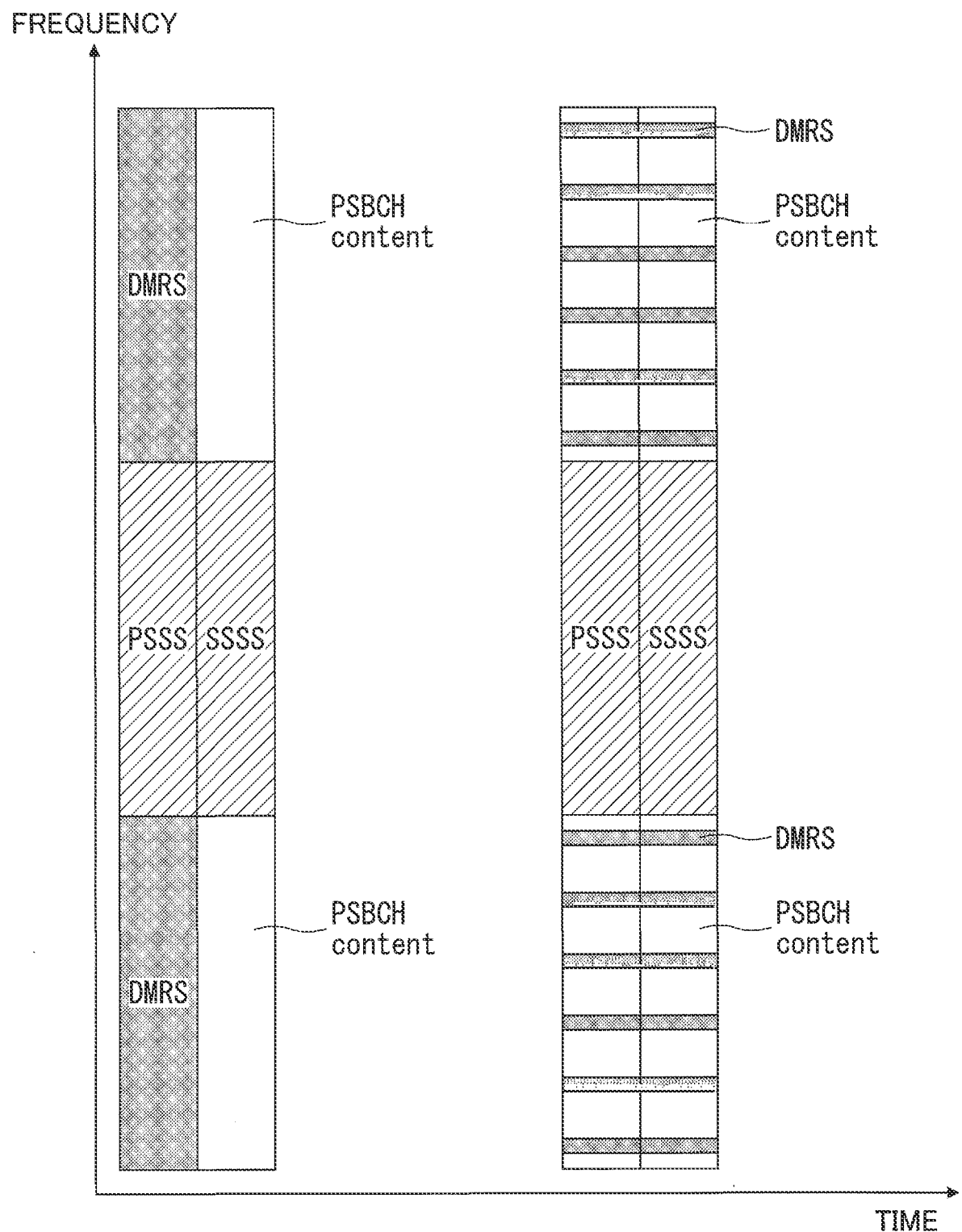
FIG. 11 is a diagram illustrating an example of a channel allocation based on frequency division multiplexing in an embodiment of the present invention.

FIG. 11 is a diagram illustrating an example of a channel allocation by frequency division multiplexing in an embodiment of the present invention. FIG. 11 illustrates an example where SLSS and PSBCH are frequency division multiplexed. As illustrated in FIG. 11, in a resource of two symbols, a DMRS, a PSSS, and a DMRS may be allocated in the frequency domain in sequence in symbol #1, and content of a PSBCH, a SSSS, and content of a PSBCH may be allocated in symbol #2 in sequence in the frequency domain. Furthermore, as illustrated in FIG. 11, in a resource of two symbols, a DMRS and content of a PSBCH that are frequency division multiplexed, a PSSS, and a DMRS and content of a PSBCH that are frequency division multiplexed may be allocated in the frequency domain in symbol #1 in this order, and a DMRS and content of a PSBCH that are frequency division multiplexed, a SSSS, and a DMRS and content of a PSBCH that are frequency division multiplexed may be allocated in the frequency domain in symbol #2 in this order.

Figure 12:
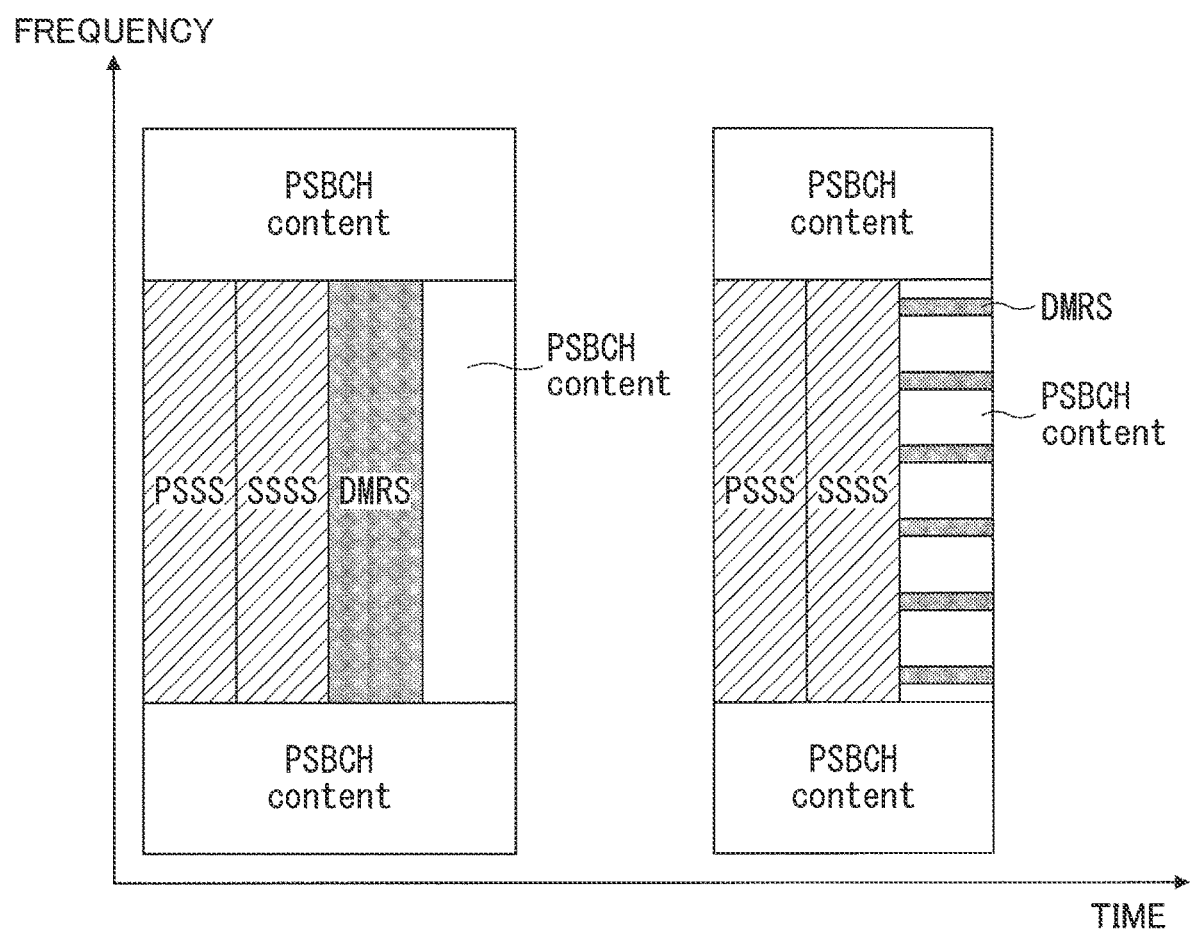
FIG. 12 is a diagram illustrating an example (1) of a channel allocation based on time division multiplexing and frequency division multiplexing in an embodiment of the present invention.

FIG. 12 is a diagram illustrating an example (1) of a channel allocation by time division multiplexing and frequency division multiplexing in an embodiment of the present invention. FIG. 12 illustrates an example where the PSSS and SSSS are allocated in adjacent symbols and the SLSS and PSBCH are time division multiplexed and frequency division multiplexed. As illustrated in FIG. 12, in a resource of four symbols, content of a PSBCH may be allocated at both ends of the entire four symbols in the frequency domain, and, at a center portion in the frequency domain, a PSSS may be allocated in symbol #1, a SSSS may be allocated in symbol #2, a DMRS may be allocated in symbol #3, and content of a PSBCH may be allocated in symbol #4. Furthermore, as illustrated in FIG. 12, in a resource of three symbols, content of a PSBCH may be allocated at both ends of the entire three symbols in the frequency domain, and, at a center portion in the frequency domain, a PSSS may be allocated in symbol #1, a SSSS may be allocated in symbol #2, and a DMRS and content of a PSBCH that are frequency division multiplexed may be allocated in symbol #3.

Figure 13:
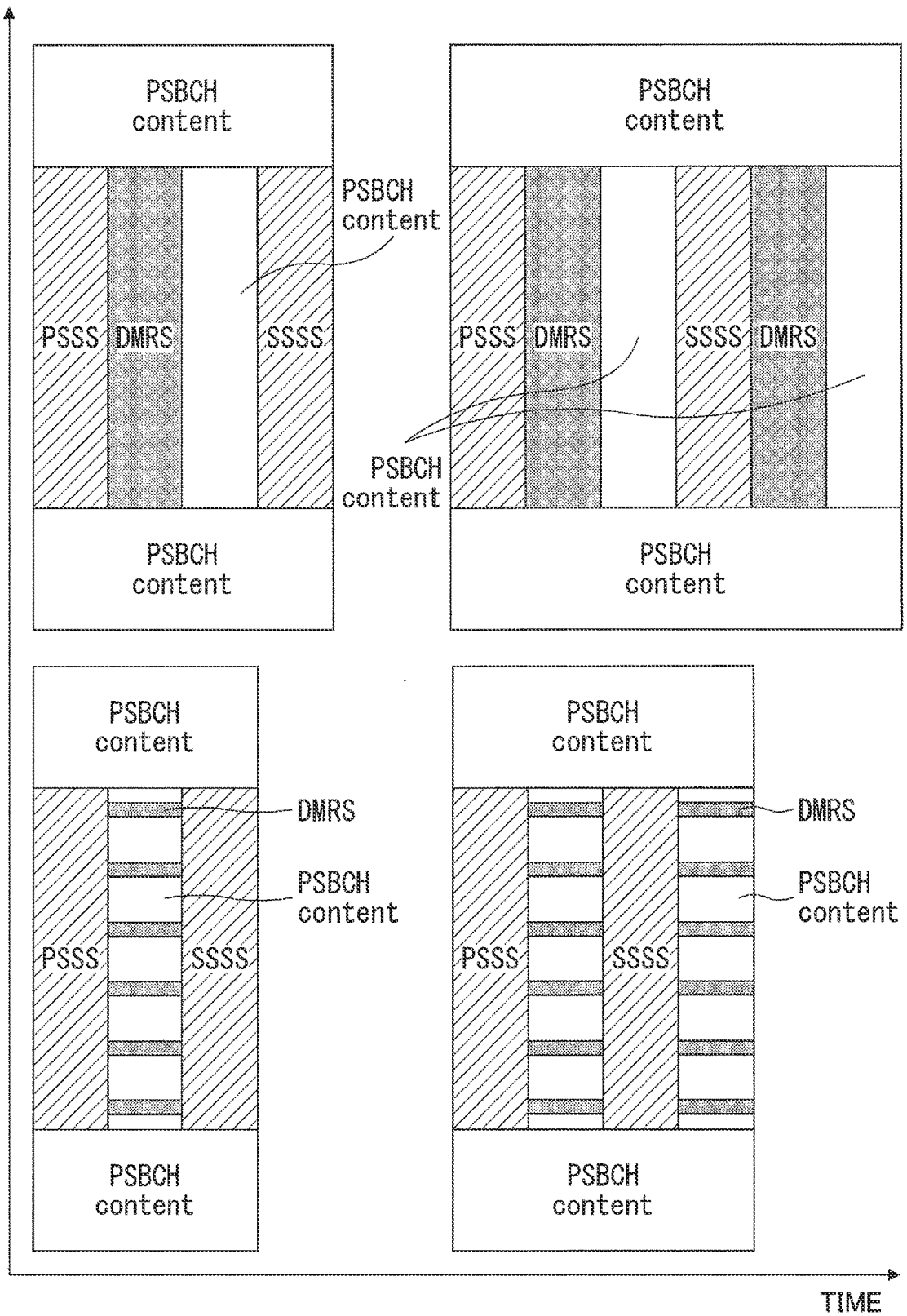
FIG. 13 is a diagram illustrating an example (2) of a channel allocation based on time division multiplexing and frequency division multiplexing in an embodiment of the present invention.

FIG. 13 is a diagram illustrating an example (2) of a channel allocation by time division multiplexing and frequency division multiplexing according to an embodiment of the present invention. FIG. 13 illustrates an example where the PSSS and SSSS are allocated in non-contiguous symbols and the SLSS and PSBCH are time division multiplexed and frequency division multiplexed. As illustrated in FIG. 13, in a resource of four symbols, content of a PSBCH may be allocated at both ends of the entire four symbols in the frequency domain, and, at a center portion in the frequency domain, a PSSS may be allocated in symbol #1, a DMRS may be allocated in symbol #2, content of a PSBCH may be allocated in symbol #3, and a SSSS may be allocated in symbol #4. Furthermore, as illustrated in FIG. 13, in a resource of six symbols, content of a PSBCH may be allocated at both ends of the entire six symbols in the frequency domain, and, at a center portion in the frequency domain, a PSSS may be allocated in symbol #1, a DMRS may be allocated in symbol #2, content of a PSBCH may be allocated in symbol #3, a SSSS may be allocated in symbol #4, a DMRS may be allocated in symbol #5, and content of a PSBCH may be allocated in symbol #6.

As illustrated in FIG. 13, in a resource of three symbols, content of a PSBCH may be allocated at both ends of the entire three symbols in the frequency domain, and, at a center portion in the frequency domain, a PSSS may be allocated in symbol #1, a DMRS and content of a PSBCH that are frequency division multiplexed may be allocated in symbol #2, and a SSSS may be allocated in symbol #3. Furthermore, as illustrated in FIG. 13, in a resource of four symbols, content of a PSBCH may be allocated at both ends of the entire four symbols in the frequency domain, and, at a center portion in the frequency domain, a PSSS may be allocated in symbol #1, a DMRS and content of a PSBCH that are frequency division multiplexed may be allocated in symbol #2, a SSSS may be allocated in symbol #3, and a DMRS and content of a PSBCH that are frequency division multiplexed may be allocated in symbol #4.

Figure 14:
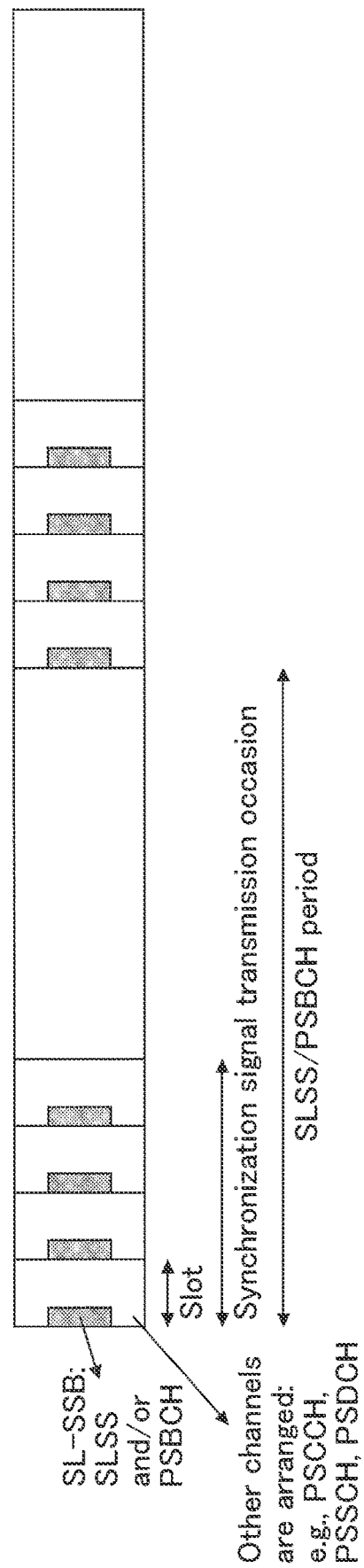
FIG. 14 is a diagram illustrating an example (1) of an allocation of a synchronization signal in an embodiment of the present invention.

FIG. 14 is a diagram illustrating an example (1) of an allocation of a synchronization signal according to an embodiment of the present invention. One or more SLSS and/or PSBCH transmissions per synchronization signal transmission occasion may be configurable. Transmission of SLSS and/or PSBCH may be defined as SL-SSB (SL-Synchronization signal block). A number of times of repetition of SL-SSB may be configured or pre-determined per synchronization signal transmission occasion. Furthermore, a number of times of repetition of SL-SSB may be configured or predetermined per slot. PHY layer and/or higher layer signaling may be used to configure SL-SSB. For example, DCI or RRC (Radio Resource Control) signaling may be used to configure SL-SSB.

Here, some or all of the configuration or definition of a DL SS/PBCH block may be used for the above-described configuration or definition of the SL-SSB. Furthermore, a DL configuration or specification may also be used for some or all of a configuration or a definition of multiplexing of SLSS/PSBCH and PSCCH/PSSCH/PSDCH described in FIGS. 6-13.

FIG. 14 is an example in which four SL-SSBs are allocated per synchronization signal transmission occasion and one SL-SSB is allocated per slot. In a resource in which no SL-SSB is allocated, a PSCCH, a PSSCH and/or a PSDCH may be allocated. Since a PSCCH and/or PSSCH can be allocated in any slot, URLLC traffic can be supported.

Figure 15:
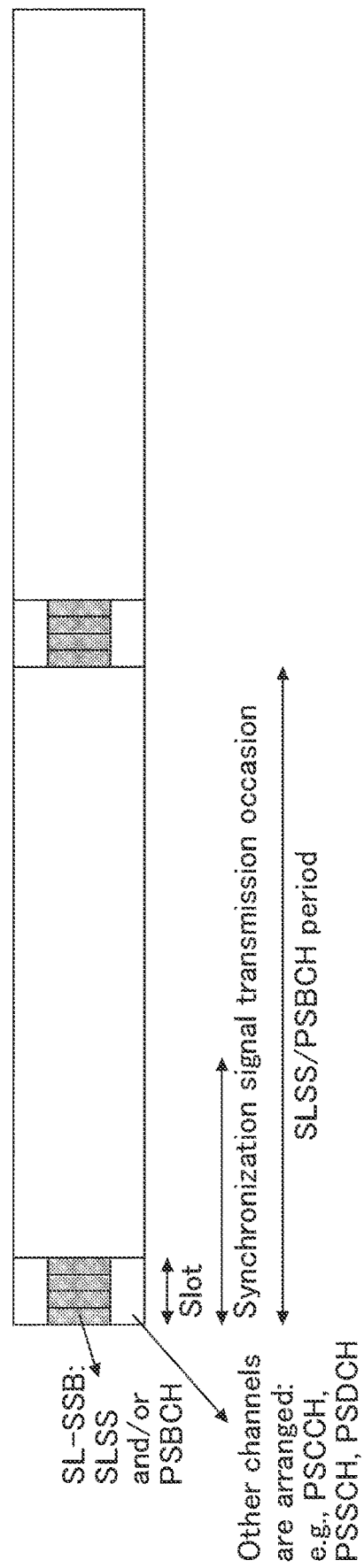
FIG. 15 is a diagram illustrating an example (2) of an allocation of a synchronization signal in an embodiment of the present invention.

FIG. 15 is a diagram illustrating an example (2) of an allocation of a synchronization signal according to an embodiment of the present invention. FIG. 15 is an example in which four SL-SSBs are allocated per synchronization signal transmission occasion and four SL-SSBs are allocated per slot. In a resource in which no SL-SSB is allocated, a PSCCH, a PSSCH and/or a PSDCH may be allocated. Similar to FIG. 14, since a PSCCH, PSSCH, and/or PSSCH can be allocated in any slot, URLLC traffic can be supported.

According to the above-described embodiments, the user equipment 20 can transmit and receive SLSS and/or PSBCH and PSCCH, PSSCH, and/or PSDCH by multiplexing the SLSS and/or PSBCH and the PSCCH, PSSCH and/or PSDCH in a same slot.

Namely, flexible scheduling can be performed in inter-terminal direct communication.

(Device Configuration)

Next, a functional configuration example of each of the base station apparatus 10 and the user equipment 20 that execute the processes and the operation described so far is described. Each of the base station apparatus 10 and the user equipment 20 has the function of implementing the embodiments. Here, each of the base station apparatus 10 and the user equipment 20 may have only some of the functions in the embodiment.

<Base Station Apparatus 10>

Figure 16:
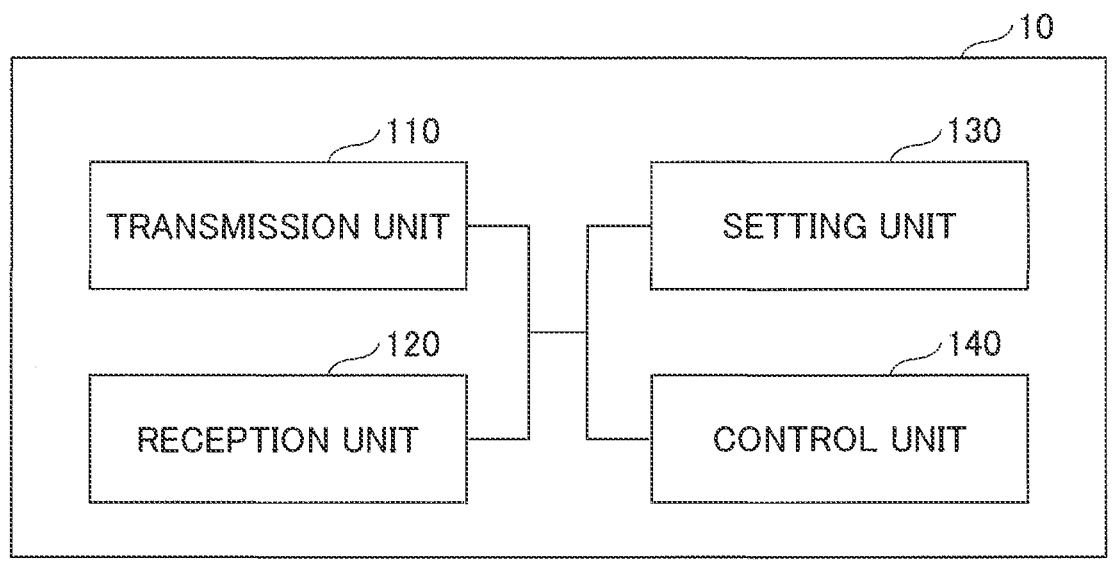
FIG. 16 is a diagram illustrating an example of a functional configuration of a base station apparatus 10 in an embodiment of the present invention.

FIG. 16 is a diagram illustrating an example of a functional configuration of the base station apparatus 10. As illustrated in FIG. 16, the base station apparatus 10 has a transmission unit 110, a reception unit 120, a setting unit 130, and a control unit 140. The functional configuration illustrated in FIG. 16 is merely an example. As long as the operation according to the embodiments of the present invention can be executed, the function classification and the name of the function unit may be any classification and name.

The transmission unit 110 has a function of generating a signal to be transmitted to the user equipment 20 and transmitting the signal wirelessly. The reception unit 120 has a function of receiving various types of signals transmitted from the user equipment 20 and acquiring, for example, information of a higher layer from the received signals. The transmission unit 110 has a function of transmitting the NR-PSS, the NR-SSS, the NR-PBCH, the DL/UL control signal, or the like to the user equipment 20. Furthermore, the transmission unit 110 transmits information indicating that a terminal approaches the user equipment 20, and the reception unit 120 receives terminal information from the user equipment 20.

The setting unit 130 stores pre-configured configuration information and various types of configuration information to be transmitted to the user equipment 20 in the storage device and reads the configuration information from the storage device if necessary. For example, content of the configuration information is, for example, information related to a channel configuration of the D2D communication or the like.

As described in the embodiments, the control unit 140 performs a process related to the configuration used for the user equipment 20 to perform the D2D communication. A functional unit related to signal transmission in the control unit 140 may be included in the transmission unit 110, and a functional unit related to signal reception in the control unit 140 may be included in the reception unit 120.

<User Equipment 20>

Figure 17:
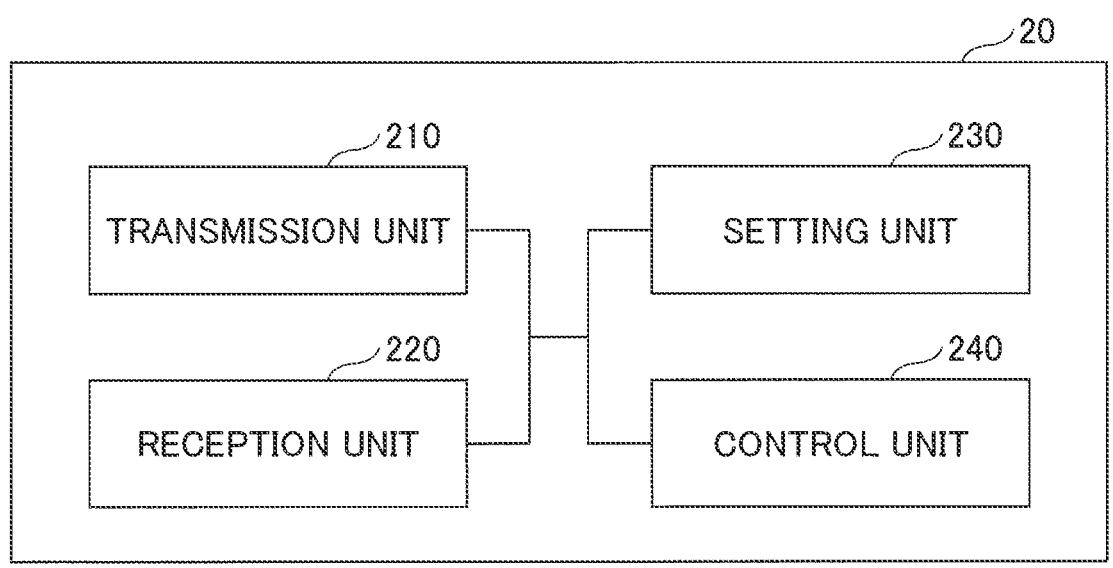
FIG. 17 is a diagram illustrating an example of a functional configuration of user equipment 20 in an embodiment of the present invention.

FIG. 17 is a diagram illustrating an example of a functional configuration of the user equipment 20. As illustrated in FIG. 17, the user equipment 20 has a transmission unit 210, a reception unit 220, a setting unit 230, and a control unit 240. The functional configuration illustrated in FIG. 17 is merely an example. As long as the operation according to the embodiments of the present invention can be executed, the function classification and the name of the function unit may be any classification and name.

The transmission unit 210 generates a transmission signal from transmission data and transmits the transmission signal wirelessly. The reception unit 220 wirelessly receives various types of signals, and acquires a signal of a higher layer from a received signal of a physical layer. The reception unit 220 also has a function of receiving the NR-PSS, the NR-SSS, the NR-PBCH, the DL/UL/SL control signal, or the like transmitted from the base station apparatus 10. Furthermore, for example, the transmission unit 210 may transmit a physical sidelink control channel (PSCCH), a physical sidelink shared channel (PSSCH), a physical sidelink discovery channel (PSDCH), a physical sidelink broadcast channel (PSBCH), and the like to any other user equipment 20 as the D2D communication, and the reception unit 120 receives the PSCCH, the PSSCH, the PSDCH, the PSBCH, and the like from any other user equipment 20.

The setting unit 230 stores various types of configuration information received from the base station apparatus 10 or the user equipment 20 through the reception unit 220 in the storage device and reads the configuration information from the storage device if necessary. The setting unit 230 also stores pre-configured configuration information. For example, content of the configuration information is, for example, information related to the channel configuration of the D2D communication or the like.

The control unit 240 controls D2D communication with other user equipment 20 as described above in the embodiments. Furthermore, the control unit 240 performs a transmission and reception process through each channel of D2D communication. A functional unit related to signal transmission in the control unit 240 may be included in the transmission unit 210, and a functional unit related to signal reception in the control unit 240 may be included in the reception unit 220.

(Hardware Configuration)

In the functional configuration diagrams (FIGS. 16 and 17) used for the description of the above-described embodiments, the blocks of the functional units are illustrated. The functional blocks (components) are implemented by any combination of hardware and/or software. A method of implementing each functional block is not particularly limited. In other words, each functional block may be implemented by one device in which a plurality of elements is physically and/or logically combined or may be implemented by a plurality of devices, that is, two or more devices which are physically and/or logically separated and are directly and/or indirectly connected (for example, by wire and/or radio).

Figure 18:
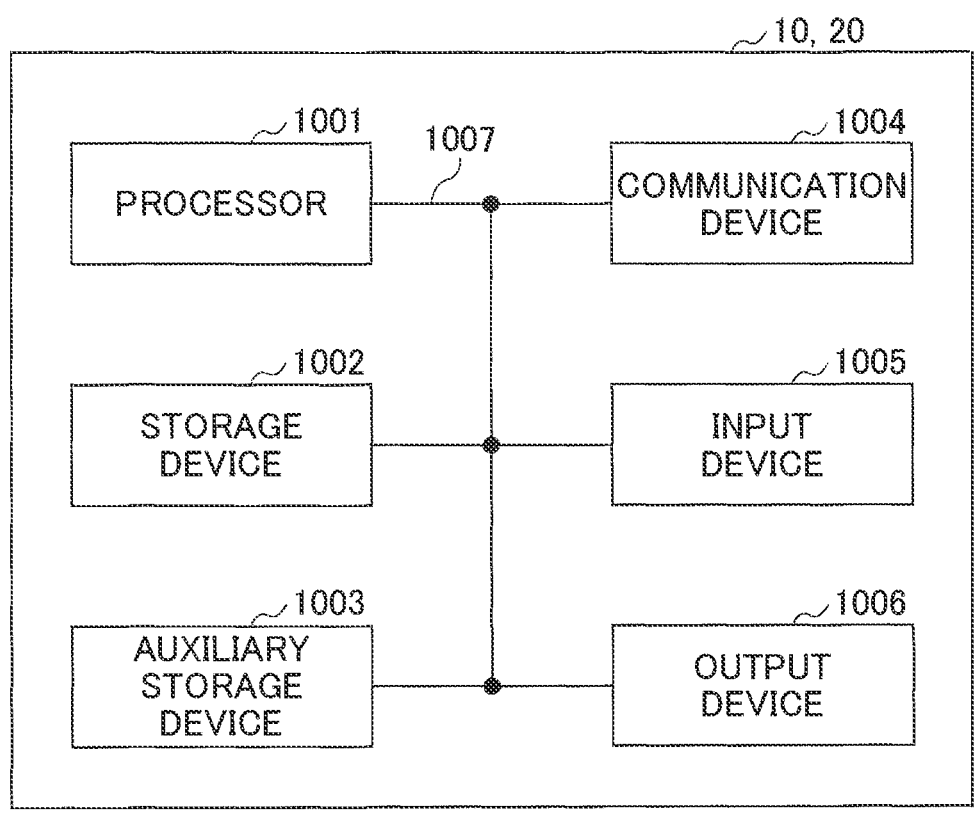
FIG. 18 is a diagram illustrating an example of a hardware configuration of the base station apparatus 10 or the user equipment 20 in an embodiment of the present invention.

For example, the base station apparatus 10, the user equipment 20, or the like in an embodiment of the present invention may function as a computer for performing a process according to the embodiments of the present invention. FIG. 18 is a diagram illustrating an example of a hardware configuration of the base station apparatus 10 or the user equipment 20 according to an embodiment of the present invention. Each of the base station apparatus 10 and the user equipment 20 may be physically configured as a computer device including a processor 1001, a storage device 1002, an auxiliary storage device 1003, a communication device 1004, an input device 1005, an output device 1006, a bus 1007, and the like.

In the following description, the term "device" can be read as a circuit, device, unit, or the like. The hardware configuration of each of the base station apparatus 10 and the user equipment 20 may be configured to include one or more devices depicted, which are indicated by 1001~1006, or may be configured without including some devices.

Each function in each of the base station apparatus 10 and the user equipment 20 is implemented such that predetermined software (program) is read on hardware such as the processor 1001 and the storage device 1002, and the processor 1001 performs an operation and controls communication by the communication device 1004 and reading and/or writing of data in the storage device 1002 and the auxiliary storage device 1003.

For example, the processor 1001 operates an operating system and controls the entire computer. The processor 1001 may be configured with a central processing unit (CPU) including an interface with a peripheral device, a control device, an operation device, a register, and the like.

Furthermore, the processor 1001 reads a program (program code), a software module, or data from the auxiliary storage device 1003 and/or the communication device 1004 out to the storage device 1002, and executes various types of processes according to them. A program causing a computer to execute at least some of the operations described in the above embodiments is used as the program. For example, the transmission unit 110, the reception unit 120, the setting unit 130, and the control unit 140 of the base station apparatus 10 illustrated in FIG. 16 may be implemented by a control program which is stored in the storage device 1002 and operates on the processor 1001. Furthermore, for example, the transmission unit 210, the reception unit 220, the setting unit 230, and the control unit 240 of the user equipment 20 illustrated in FIG. 17 may be implemented by a control program which is stored in the storage device 1002 and operates on the processor 1001. Various types of processes are described to be performed by one processor 1001 but may be performed simultaneously or sequentially by two or more processors 1001. The processor 1001 may be implemented by one or more chips. The program may be transmitted from a network via an electric communication line.

The storage device 1002 is a computer readable recording medium and configured with at least one of a read only memory (ROM), an erasable programmable ROM (EPROM), an electrically erasable programmable ROM (EEPROM), a random access memory (RAM), and the like. The storage device 1002 is also referred to as a "register," a "cache," a "main memory," or the like. The storage device 1002 can store programs (program codes), software modules, or the like which are executable for carrying out the process according to the embodiments of the present invention.

The auxiliary storage device 1003 is a computer-readable recording medium and may be configured with, for example, at least one of an optical disk such as a compact disc ROM (CD-ROM), a hard disk drive, a flexible disk, a magneto-optical disk (for example, a compact disk, a digital versatile disk, or a Blu-ray (registered trademark) disc, a smart card, a flash memory (for example, a card, a stick, or a key drive), a floppy (registered trademark) disk, a magnetic strip, and the like. The auxiliary storage device 1003 is also referred to as an "auxiliary storage device." The storage medium may be, for example, a database, a server, or any other appropriate medium including the storage device 1002 and/or the auxiliary storage device 1003.

The communication device 1004 is hardware (a transmitting and receiving device) for performing communication between computers via a wired network and/or a wireless network and is also referred to as a "network device," a "network controller," a "network card," a "communication module," or the like. For example, the transmission unit 110 and the reception unit 120 of the base station apparatus 10 may be implemented by the communication device 1004. Furthermore, the transmission unit 210 and the reception unit 220 of the user equipment 20 may be implemented by the communication device 1004.

The input device 1005 is an input device that receives an input from the outside (such as a keyboard, a mouse, a microphone, a switch, a button, a sensor, or the like). The output device 1006 is an output device that performs an output to the outside (for example, a display, a speaker, an LED lamp, or the like). The input device 1005 and the output device 1006 may be integrally configured (for example, a touch panel).

The respective devices such as the processor 1001 and the storage device 1002 are connected via the bus 1007 to communicate information with each other. The bus 1007 may be configured with a single bus or may be configured with different buses between the devices.

Furthermore, each of the base station apparatus 10 and the user equipment 20 may be configured to include hardware such as a microprocessor, a digital signal processor (DSP), an application specific integrated circuit (ASIC), a programmable logic device (PLD), or a field programmable gate array (FPGA) or all or some of the functional blocks may be implemented by hardware. For example, the processor 1001 may be implemented by at least one of these pieces of hardware.

Conclusion of the Embodiments

As described above, according to the embodiments of the present invention, there is provided a user equipment including a control unit that controls transmission or reception of a sidelink signal in which a first resource and a second resource are multiplexed in a same slot, wherein at least one of SLSS (Sidelink synchronization signal) or PSBCH (Physical Sidelink Broadcast Channel) is allocated in the first resource, and at least one of PSCCH (Physical Sidelink Control Channel), PSSCH (Physical Sidelink Shared Channel), and PSDCH (Physical Sidelink Discovery Channel) is allocated in the second resource; a reception unit that monitors the first resource, the second resource, or the first resource and the second resource; and a transmission unit that performs transmission using any one of the first resource, the second resource, and the first resource and the second resource.

With the above-described configuration, the user equipment 20 can multiplex the SLSS and/or PSBCH and the PSCCH, PSSCH and/or PSDCH within the same slot. That is, flexible scheduling can be performed in inter-terminal direct communication.

When another sidelink resource in which at least one of SLSS and PSBCH is allocated is available, monitoring of the first resource need not be performed. With this configuration, the user equipment 20 can stop unnecessary monitoring and reduce power consumption.

When a synchronization signal transmitted from a base station apparatus or a GNSS (Global Navigation Satellite System) is available, monitoring of the SLSS allocated in the first resource need not be performed. With this configuration, the user equipment 20 can stop unnecessary monitoring and reduce power consumption.

In the sidelink signal, the first resource and the second resource may be time division multiplexed, and a gap may be allocated in a time domain between the first resource and the second resource. With this configuration, the user equipment 20 can ensure a time for switching an RF circuit, or the like.

The SLSS allocated in the first resource may include a PSSS (Primary Sidelink Synchronization Signal) and a SSSS (Secondary Sidelink Synchronization Signal), the PSBCH allocated in the first resource may include a DMRS (demodulation reference signal) and content of the PSBCH, and, when the DMRS and the content of the PSBCH are time division multiplexed, the PSSS or the SSSS may be used as the DMRS. With this configuration, the user equipment 20 can reduce consumption of resources by demodulating the PSBCH using the PSSS or the SSSS, instead of a usual DMRS.

The PSBCH allocated in the first resource may include a DMRS and content of the PSBCH that are frequency division multiplexed, and the SLSS and the PSBCH that are allocated in the first resource may be frequency division multiplexed. With this configuration, the user equipment 20 can transmit the SLSS and the PSBCH while frequency division multiplexing the SLSS and the PSBCH.

Supplemental Embodiment

The exemplary embodiment of the present invention has been described above, but the disclosed invention is not limited to the above embodiments, and those skilled in the art would understand various modified examples, revised examples, alternative examples, substitution examples, and the like. In order to facilitate understanding of the invention, specific numerical value examples have been used for description, but the numerical values are merely examples, and certain suitable values may be used unless otherwise stated. The classification of items in the above description is not essential to the present invention. Matters described in two or more items may be combined and used if necessary, and a matter described in one item may be applied to a matter described in another item (unless inconsistent). The boundary between functional units or processing units in a functional block diagram does not necessarily correspond to the boundary between physical parts. Operations of a plurality of functional units may be performed physically by one component, or an operation of one functional unit may be physically performed by a plurality of parts. In the processing procedure described in the embodiments, the order of the processes may be changed as long as there is no inconsistency. For the sake of convenience of processing description, the base station apparatus 10 and the user equipment 20 have been described using the functional block diagrams, but such devices may be implemented by hardware, software, or a combination thereof. Software executed by the processor included in the base station apparatus 10 according to the embodiment of the present invention and software executed by the processor included in the user equipment 20 according to the embodiment of the present invention may be stored in a random access memory (RAM), a flash memory, a read only memory (ROM), an EPROM, an EEPROM, a register, a hard disk (HDD), a removable disk, a CD-ROM, a database, a server, or any other appropriate storage medium.

Furthermore, a notification of information is not limited to the aspect or embodiment described in the specification and may be provided by any other method. For example, the notification of information may be given by physical layer signaling (for example, downlink control information (DCI) or uplink control information (UCI)), upper layer signaling (for example, radio resource control (RRC) signaling, medium access control (MAC) signaling, broadcast information (master information block (MIB), system information block (SIB)), other signals, or a combination thereof. Furthermore, the RRC signaling may be referred to as an RRC message and may be, for example, an RRC connection setup message, an RRC connection reconfiguration message, or the like.

Each aspect and embodiment described in the specification may be applied to Long Term Evolution (LTE), LTE-advanced (LTE-A), SUPER 3G, IMT-advanced, 4G, 5G, Future Radio Access (FRA), W-CDMA (registered trademark), GSM (registered trademark), CDMA 2000, Ultra Mobile Broadband (UMB), IEEE 802.11 (Wi-Fi), IEEE 802.16 (WiMAX), IEEE 802.20, Ultra-WideBand (UWB), Bluetooth (registered trademark), a system using any other appropriate system, and/or next generation systems extended based on these standards.

The processing procedures, the sequences, the flowcharts, and the like of the respective aspects/embodiments described in this specification may be reversed in order unless there is a contradiction. For example, the method described in the specification presents elements of various steps with an exemplary order and is not limited to a presented specific order.

In this specification, a specific operation to be performed by the base station apparatus 10 may be performed by an upper node in some cases. In the network including one or more network nodes including the base station apparatus 10, various operations performed for communication with the user equipment 20 can be obviously performed by the base station apparatus 10 and/or any network node (for example, an MME, an S-GW, or the like is considered, but it is not limited thereto) other than the base station apparatus 10 and/or the base station apparatus 10. A case is exemplified above in which there is one network node other than the base station apparatus 10. The one network node may be a combination of a plurality of other network nodes (e.g., MME and S-GW).

Each aspect/embodiment described herein may be used alone, in combination, or switched according to execution.

The user equipment 20 may be referred to by a person ordinarily skilled in the art as a subscriber station, a mobile unit, a subscriber unit, a wireless unit, a remote unit, a mobile device, a wireless device, a wireless communication device, a remote device, a mobile subscriber station, an access terminal, a mobile terminal, a wireless terminal, a remote terminal, a handset, a user agent, a mobile client, a client, or some other suitable terms.

The base station apparatus 10 may be referred to by a person ordinarily skilled in the art as NB (NodeB), eNB (evolved NodeB), gNB (next generation eNB), Base Station, or some other suitable terms.

The term "determining" used in this specification may include a wide variety of actions. For example, "determining" may include, for example, events in which events such as judging, calculating, computing, processing, deriving, investigating, looking up, search, and inquiry (for example, looking up in a table, a database, or another data structure), or ascertaining are regarded as "determining." Furthermore, "determining" may include, for example, events in which events such as receiving (for example, receiving information), transmitting (for example, transmitting information), input, output, or accessing (for example, accessing data in a memory) are regarded as "determining." Furthermore, "determining" may include, for example, events in which events such as resolving, selecting, choosing, establishing, or comparing are regarded as "determining." In other words, "determining" may include events in which a certain operation is regarded as "determining." Furthermore, "determining" may be replaced with "assuming," "expecting," "considering," or the like.

A phrase "based on" used in the specification is not limited to "based on only" unless otherwise stated. In other words, a phrase "based on" means both "based on only" and "based on at least."

In a case in which "include," "including," and variations thereof are used in the specification and the claims, these terms are intended to be comprehensive, similar to a term "comprising." Furthermore, the term "or" used in the specification and the claims is intended not to be an exclusive disjunction.

In the entire present disclosure, for example, when an article such as "a," "an," or "the" in English is added by a translation, the present disclosure may include a case in which a noun following the article is the plural unless the context clearly indicates that they are not.

The SLSS may be a sidelink synchronization signal, and the SLSS may be referred to as a D2D synchronization signal. The PSBCH may be a sidelink broadcast channel for transmitting system information and the like, and the PSBCH may be referred to as a D2D broadcast channel. The PSCCH may be a sidelink control channel for transmitting a control signal and the like, and the PSCCH may be referred to as a D2D control channel. The PSSCH may be a sidelink shared channel for transmitting data and the like, and the PSSCH may be referred to as a D2D shared channel. The PSDCH may be a sidelink discovery channel used for detecting a terminal, and the PSDCH may be referred to as a D2D discovery channel.

Although the present invention is described above in detail, it is obvious to those skilled in the art that the present invention is not limited to the embodiments described in the specification. The present invention may be implemented as revised and modified forms without departing from the gist and scope of the present invention as set forth in claims. Therefore, the description of the present invention is for the purpose of illustration and does not have any restrictive meaning to the present invention.

LIST OF REFERENCE SYMBOLS

10 base station apparatus
110 transmission unit
120 reception unit
130 setting unit
140 control unit
20 user equipment
210 transmission unit
220 reception unit
230 setting unit
240 control unit
1001 processor
1002 storage device
1003 auxiliary storage device
1004 communication device
1005 input device
1006 output device

The invention claimed is:

1. A terminal comprising:
a processor that time-division multiplexes a first synchronization signal for inter-terminal direct communication, a second synchronization signal for the inter-terminal direct communication, and a broadcast channel for the inter-terminal direct communication; and
a transmitter that transmits, to another terminal, the first synchronization signal, the second synchronization signal, and the broadcast channel,
wherein the processor allocates the second synchronization signal to a symbol adjacent to a symbol to which the first synchronization signal is allocated, and
wherein, in a symbol in which the broadcast channel is allocated, the processor frequency-division multiplexes the broadcast channel and a demodulation reference signal.

2. The terminal according to claim 1,
wherein the processor sets, on a per transmission occasion of a synchronization signal for the inter-terminal direct communication basis, a number of times of transmitting a synchronization signal block for the inter-terminal direct communication, the synchronization signal block being formed of the first synchronization signal, the second synchronization signal, and the broadcast channel, and wherein the transmitter transmits, to the another terminal, the first synchronization signal, the second synchronization signal, and the broadcast channel, based on the number of times of transmitting the synchronization signal block.

3. The terminal according to claim 1, wherein the processor allocates one synchronization signal block per one slot.

4. A communication method executed by a terminal, the method comprising:

time-division multiplexing a first synchronization signal for inter-terminal direct communication, a second synchronization signal for the inter-terminal direct communication, and a broadcast channel for the inter-terminal direct communication; and transmitting, to another terminal, the first synchronization signal, the second synchronization signal, and the broadcast channel, wherein the transmitting allocates the second synchronization signal to a symbol adjacent to a symbol to which the first synchronization signal is allocated, and wherein, in a symbol in which the broadcast channel is allocated, the terminal frequency-division multiplexes the broadcast channel and a demodulation reference signal.

* * * * *